United States Patent
Rogers, Jr.

(10) Patent No.: US 6,386,472 B1
(45) Date of Patent: May 14, 2002

(54) ACCELERATION SENSOR ASSEMBLY FOR A RESTRAINT RETRACTOR

(75) Inventor: Lloyd Walker Rogers, Jr., Shelby Township, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/540,562

(22) Filed: Mar. 31, 2000

(51) Int. Cl.[7] ............................................... B65H 22/40
(52) U.S. Cl. ...................................................... 242/384
(58) Field of Search .............................. 242/384, 384.1, 242/384.5, 384.6; 280/806; 297/478

(56) References Cited

U.S. PATENT DOCUMENTS

| | | | | |
|---|---|---|---|---|
| 4,164,335 A | * | 8/1979 | Kondziola | 242/384.1 |
| 4,314,680 A | * | 2/1982 | Takada | 242/384.1 |
| 4,485,986 A | * | 12/1984 | Sugimoto | 242/384.1 |
| 4,688,825 A | * | 8/1987 | Arbogast et al. | 280/806 X |
| 4,726,540 A | * | 2/1988 | Ches et al. | 280/806 X |
| 5,538,098 A | * | 7/1996 | Sparhawk | 280/806 X |
| 6,164,581 A | * | 12/2000 | Freeman et al. | 242/384.1 X |

* cited by examiner

Primary Examiner—William A. Rivera
(74) Attorney, Agent, or Firm—Kathryn A. Marra

(57) ABSTRACT

An acceleration sensor assembly for a restraint retractor of a seat restraint system in a vehicle includes an acceleration sprocket operatively connected to the restraint retractor. The acceleration sensor assembly also includes an acceleration pawl cooperating with the acceleration sprocket to operatively cause lock up of the restraint retractor. The acceleration sensor assembly includes a mass member cooperating with the acceleration pawl to move the acceleration pawl when an acceleration force is present. The acceleration sensor assembly further includes an electromagnet assembly cooperating with the mass member to hold the mass member in a predetermined position until the acceleration force exceeds a predetermined value and the mass member moves to actuate the acceleration pawl to engage the acceleration sprocket to operatively cause lock up the restraint retractor and prevent unwinding of a belt from the restraint retractor.

14 Claims, 2 Drawing Sheets

ACCELERATION SENSOR ASSEMBLY FOR A RESTRAINT RETRACTOR

TECHNICAL FIELD

The present invention relates generally to seat restraint systems for vehicles and, more particularly, to an acceleration sensor assembly for a restraint retractor of a seat restraint system in a vehicle.

BACKGROUND OF THE INVENTION

It is known to provide a seat restraint system such as a seat belt in a vehicle to restrain an occupant in a seat of the vehicle. In some vehicles, the seat restraint system may be a lap belt, a shoulder belt or both. Typically, the lap belt and shoulder belt are connected together at one end. The seat restraint system includes a latch plate at the connected end. The seat restraint system also includes a buckle connected at one end by webbing or the like to vehicle structure. The buckle receives the latch plate to be buckled together. When the buckle and latch plate are buckled together, the seat restraint system restrains movement of the occupant to help protect the occupant during a collision.

It is also known to provide a restraint retractor for the seat restraint system. Typically, the restraint retractor has a spool attached to belt webbing of the seat restraint and is rotatably mounted to the restraint retractor by a shaft. The restraint retractor has a spiral spring on one end of the shaft to urge the spool in a direction for retracting the belt webbing when not in use. Also, the restraint retractor has a toothed locking sprocket on the other end of the shaft and a locking pawl to engage the sprocket to lock the shaft against rotation in the other direction to prevent belt webbing unwinding. The locking sprocket is typically slaved to an acceleration sprocket via a spring and an acceleration pawl is actuated by an acceleration sensing mechanism or sensor. The acceleration sensor includes a mass member or "standing man" that may be spherically shaped or frusto-conical in shape to engage and actuate the acceleration pawl.

The restraint retractor is attached to the seat or vehicle body. In an "all belts to seat" application, the restraint retractor is attached to a frame of a seat back of the seat. When the restraint retractor is attached to the seat, the acceleration sensor is sensitive and the mass member is easily activated, such as when the seat back is reclined, thereby actuating the acceleration pawl to engage the acceleration sprocket and operatively causing the locking sprocket and locking pawl to engage via the spring to lock the shaft of the restraint retractor against rotation. This condition is undesired.

Therefore, it is desirable to provide an acceleration sensor for a restraint retractor of a seat restraint system in a vehicle that is de-sensitized. It is also desirable to provide an acceleration sensor for a restraint retractor of a seat restraint system in a vehicle that eliminates noise. It is further desirable to provide an acceleration sensor for a restraint retractor of a seat restraint system in a vehicle that has the ability to allow acceleration sensing.

SUMMARY OF THE INVENTION

It is, therefore, one object of the present invention to provide an acceleration sensor assembly for a restraint retractor of a seat restraint system in a vehicle that is de-sensitized.

It is another object of the present invention to provide an acceleration sensor assembly for a restraint retractor of a seat restraint system in a vehicle that eliminates noise.

To achieve the foregoing objects, the present invention is an acceleration sensor assembly for a restraint retractor of a seat restraint system including an acceleration sprocket operatively connected to the restraint retractor. The acceleration sensor assembly also includes an acceleration pawl cooperating with the sprocket to lock up the restraint retractor. The acceleration sensor assembly includes a mass member cooperating with the locking member to move the locking pawl when an acceleration force is present. The acceleration sensor assembly further includes an electromagnet assembly cooperating with the mass member to hold the mass member in a predetermined position until the force exceeds a predetermined value. The mass member moves to actuate the locking pawl to engage the sprocket to lock up the restraint retractor and prevent unwinding of a belt from the restraint retractor.

One advantage of the present invention is that an acceleration sensor assembly is provided for a restraint retractor of a seat restraint system in a vehicle. Another advantage of the present invention is that the acceleration sensor assembly eliminates noise for a seat restraint system in a vehicle. Yet another advantage of the present invention is that the acceleration sensor assembly changes the "G" level and allows the restraint retractor to operate with high "G" accelerations or decelerations. Still another advantage of the present invention is that the acceleration sensor assembly senses in three hundred sixty degrees of horizontal plane and not only in a fore-aft direction.

Other objects, features and advantages of the present invention will be readily appreciated, as the same becomes better understood after reading the subsequent description taken in conjunction with the accompanying drawings.

DESCRIPTION OF THE PREFERRED EMBODIMENT

Figure 1:
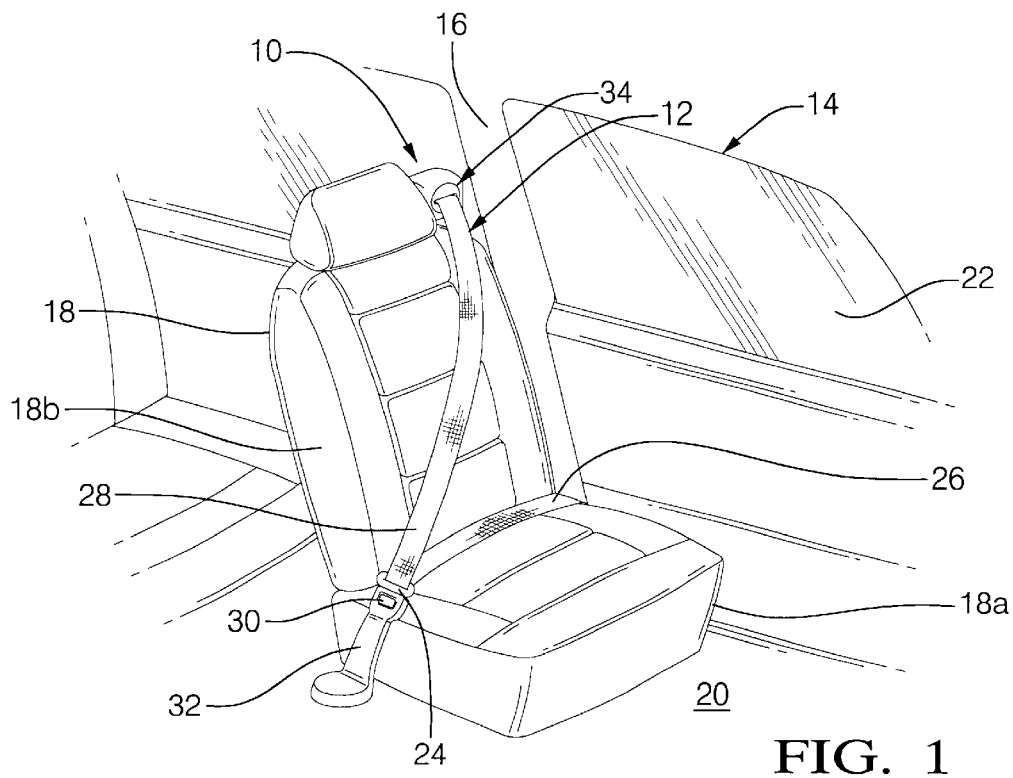
FIG. 1 is a perspective view of an acceleration sensor assembly, according to the present invention, illustrated in operational relationship with a seat restraint system of a vehicle.
Figure 2:
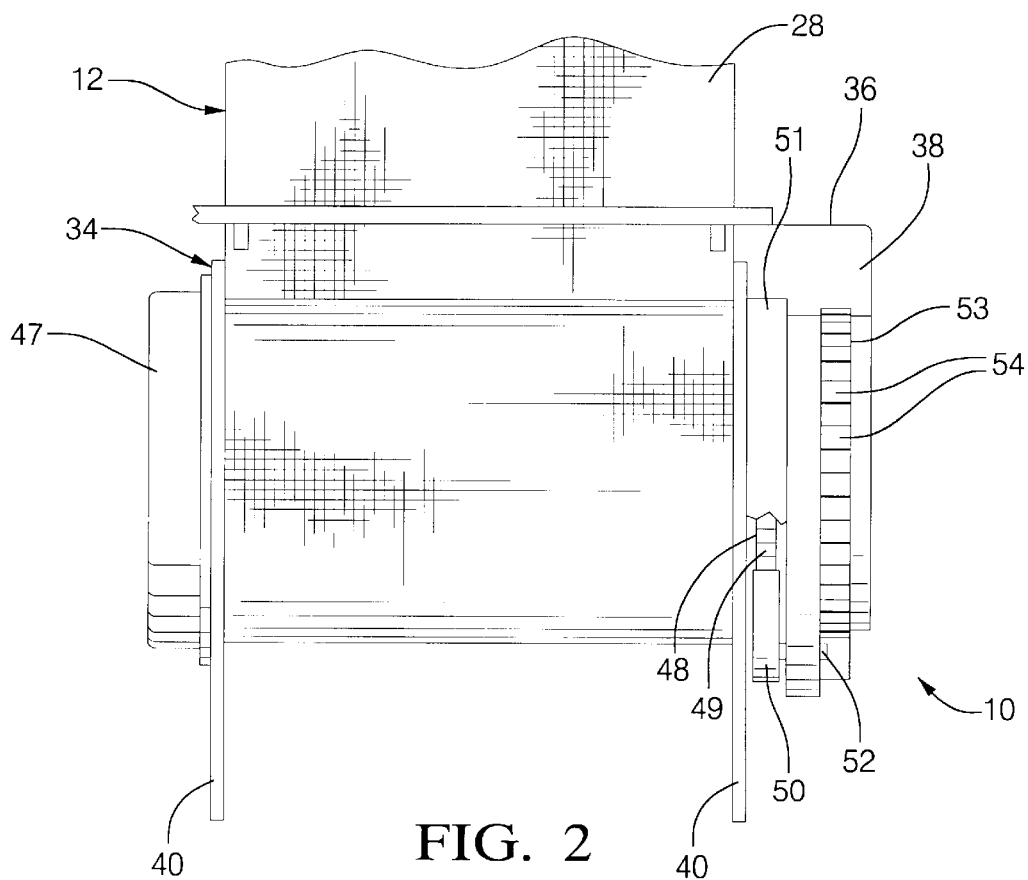
FIG. 2 is a side elevational view of the acceleration sensor assembly and a restraint retractor of the seat restraint system of FIG. 1.

Referring to the drawings and in particular FIGS. 1 and 2, one embodiment of an acceleration sensor assembly 10, according to the present invention, is shown for a seat restraint system, generally indicated at 12, in a vehicle (partially shown), generally indicated at 14. The vehicle 14 includes a vehicle body 16 and a seat 18 mounted by suitable means to vehicle structure 20 such as a floorpan in an occupant compartment 22 of the vehicle body 16. In this embodiment, the seat 18 is a front seat of the vehicle 14. The seat 18 has a seat cushion 18a and seat back 18b pivotally connected to the seat cushion 18a by suitable means (not shown). It should be appreciated that the seat 18 could be a rear, second row or third row seat for the vehicle 14.

The vehicle 14 includes the seat restraint system 12 for restraining an occupant (not shown) in the seat 18. The seat restraint system 12 includes a latch tongue or plate 24 connected to an end of either one of a lap belt 26, shoulder belt 28, or both which have another end connected to a restraint retractor 34 to be described. The seat restraint system 12 also includes a buckle assembly 30 connected by suitable means such as belt webbing 32 to the vehicle structure 20. The latch plate is engageable and disengageable with the buckle assembly 30 as is known in the art. It should be appreciated that, except for the acceleration sensor assembly 10, the seat restraint system 12 and vehicle 14 are conventional and known in the art.

Figure 3:
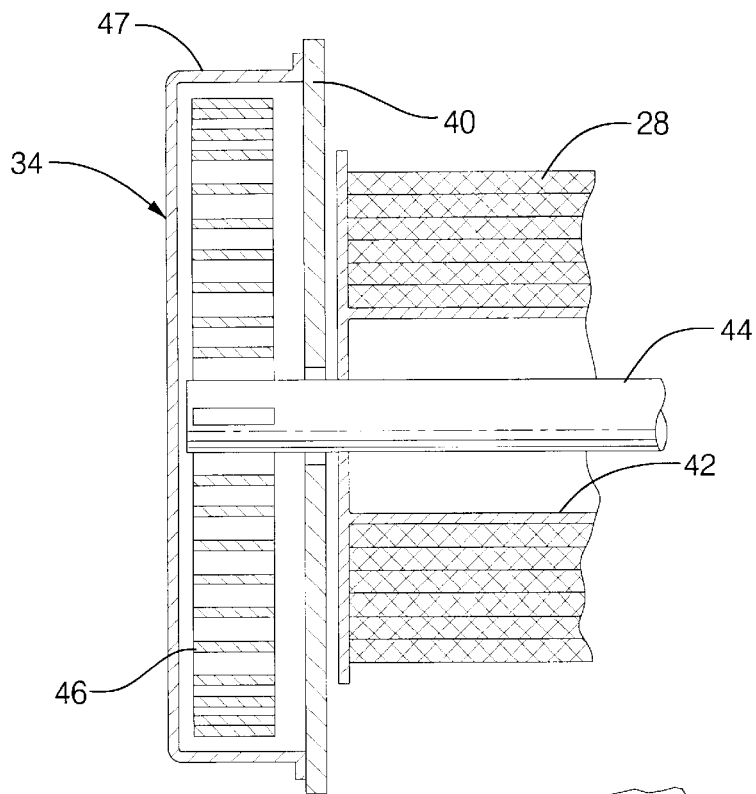
FIG. 3 is a fragmentary view of a portion of the restraint retractor of FIG. 2.

Referring to FIGS. 2 and 3, the seat restraint system 12 includes a restraint retractor, generally indicated at 34, connected to the shoulder belt 28. The restraint retractor 34 includes a housing 36 having a base wall 38 and spaced apart sidewalls 40. The restraint retractor 34 also includes a belt reel or take-up spool 42 disposed between the sidewalls 40 and connected by suitable means to the end of the shoulder belt 28. The restraint retractor 34 also includes a shaft 44 extending through the take-up spool 42 and the sidewalls 40 of the housing 36 such that the take-up spool 42 is rotatable relative to the housing 36. It should be appreciated that the housing 36 is attached by suitable means (not shown) to a frame (not shown) of the seat back 18b for the seat 18.

The restraint retractor 34 also includes a retractor spring 46 disposed about one end of the shaft 44. The retractor spring 46 is of a spiral type having one end attached to the shaft 44 and another end connected to the housing 36 as known in the art. The retractor spring 46 may be enclosed by a spring housing 47 attached to the sidewall 40 of the housing 36. The retractor spring 46 has a predetermined torque or tension and urges the shaft 44 in a predetermined direction to wind up the shoulder belt 28 on the take-up spool 42. It should be appreciated that the restraint retractor 34 may have a structure similar to that disclosed in U.S. Pat. No. 4,815,674 to Blake et al.

The restraint retractor 34 also includes a locking sprocket 48 attached to and rotatable with the other end of the shaft 44 opposite the spring 46. The locking sprocket 48 has a plurality of teeth 49 disposed circumferentially thereabout. The restraint retractor 34 includes a locking pawl 50 pivotally connected to a side wall 40 of the housing 36 by suitable means such as a pin (not shown). The locking pawl 50 is engageable with the teeth 49 to lock the shaft 44 relative to the housing 36. The restraint retractor 34 includes a guide member 51 disposed about the shaft 44 and has a locking arm (not shown) engageable with the teeth 49 on the locking sprocket 48 and a slot (not shown) extending therethrough to receive a pin 52 extending from the locking pawl 50 and received in the slot. When the belt webbing of the shoulder belt 28 is unwound above a predetermined rate, the locking arm engages the teeth 49 to rotate the guide member 51 and move the slot relative to the pin 52 causing the locking pawl 50 to pivot and engage the teeth 49 to lock the shaft 44 against rotation. It should be appreciated that the restraint retractor 34 is conventional and known in the art.

Figure 4:
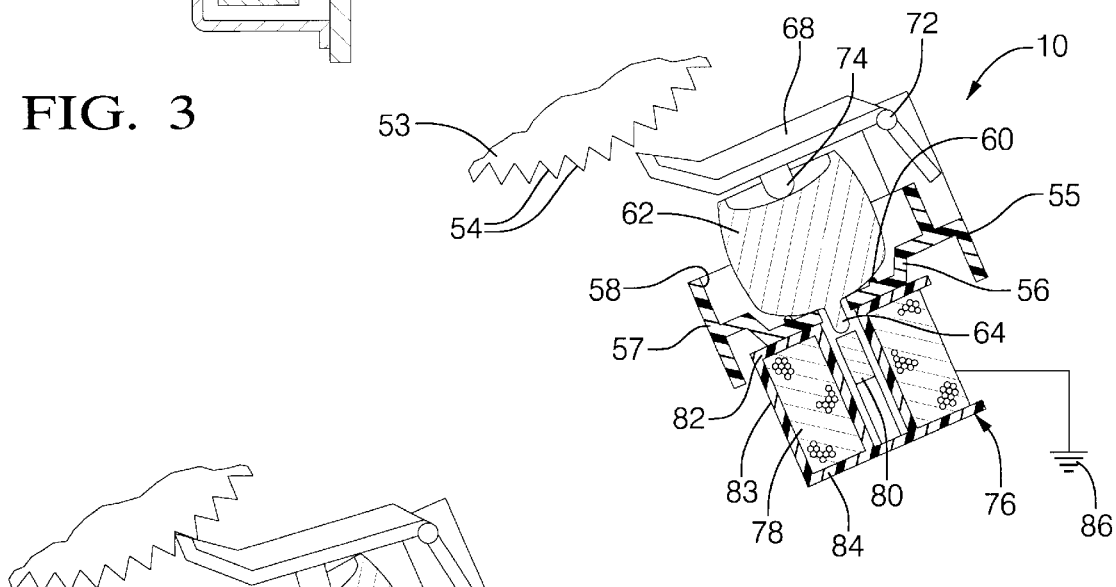
FIG. 4 is a fragmentary view of the acceleration sensor assembly of FIG. 1 illustrating a first operational state.
Figure 5:
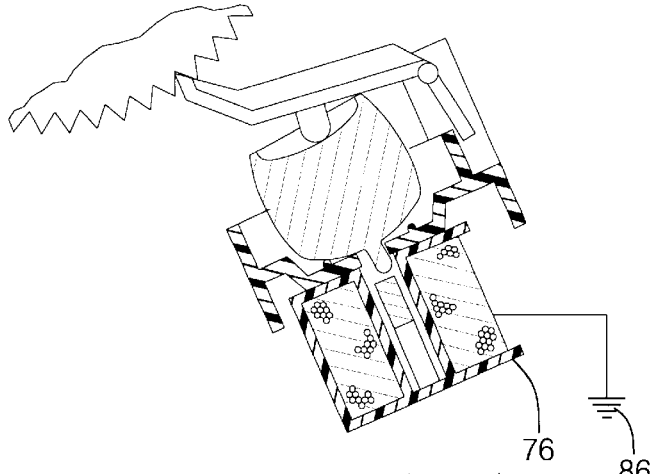
FIG. 5 is a view similar to FIG. 4 illustrating the acceleration sensor assembly in a second operational state.

Referring to FIGS. 2, 4 and 5, the acceleration sensor assembly 10, according to the present invention, includes an acceleration sprocket or disc 53 attached to and disposed about the end of the shaft 44 of the restraint retractor 34. The acceleration sprocket 53 is generally circular in shape and has a plurality of teeth 54 disposed circumferentially thereabout. The sprocket 53 is connected to the locking sprocket 48 via a spring (not shown) such that the acceleration sprocket 53 can rotate with the locking sprocket 48 at the same speed or relative thereto at different speeds. It should be appreciated that the acceleration sprocket 53 is a slave type member.

The acceleration sensor assembly 10 also includes a mass housing 55 connected by suitable means to the retractor housing 36. The mass housing 55 is generally rectangular in shape. The mass housing 55 has a base wall 56 and a side wall 57 extending generally perpendicular to the base wall 56 to form a cavity 58 therein. The mass housing 55 has an aperture 59 extending through the base wall 56 and a projection 60 spaced from and surrounding the aperture 59 for a function to be described. The mass housing 55 is made of a plastic material. The mass housing 55 is a monolithic structure being integral, unitary and formed as one-piece.

The acceleration sensor assembly 10 also includes a mass member or "standing man" 62 disposed in the cavity 58 of the mass housing 55. The mass member 62 is generally cylindrical in shape and has a projection 64 extending axially from one end and is disposed in the aperture 59 of the mass housing 55. The mass member 62 also has a recess 66 in the end opposite the projection 64. The recess 66 is arcuate in shape for a predetermined curve for certain range of forces from approximately 0.3 to approximately 0.7 G's for a function to be described. The mass member 62 is made of a metal material such as steel. It should be appreciated that the mass member 62 may have any suitable shape.

The inertia sensor assembly 10 includes an acceleration pawl or an acceleration latch 68 extending longitudinally and having a tooth portion 70 extending outwardly from an end thereof for engaging the teeth 54 on the acceleration sprocket 53. The acceleration pawl 68 is pivotally connected to the mass housing 55 by suitable means such as a pin 72. The acceleration pawl 68 has a projection 74 extending toward the cavity 58 of the mass housing 55 and is disposed in the recess 66 to engage mass member 62. The acceleration pawl 68 is made of a plastic material. Upon receiving an acceleration force, the mass member 62 pivots to move the acceleration pawl 68 to engage the teeth 54 to stop rotation of the acceleration sprocket 53 to cause the locking pawl 50 via the spring to engage the teeth 49 on the locking sprocket 48 and lock the shaft 44 to prevent pay-out of the shoulder belt 28. It should be appreciated that the acceleration sprocket 53 and locking sprocket 48 form a slave type system.

The acceleration sensor assembly 10 further includes an electromagnet assembly, generally indicated at 76, mounted to the base wall 38 of the housing 36 by suitable means such as a bracket (not shown). The electromagnet assembly 76 includes a coil 78 and a core 80 disposed within the coil 78 and extending toward the aperture 59 in the mass housing 55. The core 80 is generally cylindrical in shape and has a diameter not greater than 0.09 inches. The electromagnet assembly 76 also has a top wall 82 disposed adjacent the base wall 56 of the mass housing 55, a side wall 83 disposed adjacent the coil 78 and connected to and extending from the top wall 82 and a bottom wall 84 connected to and extending from the side wall 83 at a bottom of the coil 78 and core 80. The top wall 82, side wall 83 and bottom wall 84 are made of a ferrous material and may be integral and one piece. The coil 78 is connected to ground 86 and a source of power such as a controller (not shown). When the coil 78 is energized by power from the power source, flux through the core 80 moves the projection 64 of the mass member 62 axially toward the core 80 to engage the mass member 62 on the projection 60 of the mass housing 55.

In operation of the acceleration sensor assembly 10, the coil 78 of the electromagnet assembly 76 is energized and the shoulder belt 28 is unwound by the occupant from the restraint retractor 34 and the latch plate 24 is engaged with the buckle assembly 30. When the coil 78 is energized, the flux is distributed from the core 80 to the mass member 62 and around to the side wall 83 and coil 78. The flux creates a force on the mass member 62, holding it in a central position in the mass housing 55. This changes the sensitivity of the mass member 68 to a level above one "G". It should be appreciated that the electromagnet assembly 76 is normally on and maintains the mass member 62 in a position that will not lock up the restraint retractor 34.

When the seat back 18b of the seat 18 is reclined, the coil 78 holds the position of the mass member 62 in its central position and prevents the restraint retractor 34 from locking up. When the vehicle is subjected to a "G" load from three (3) to seven (7) G's as sensed by a central "G" sensor (not shown), the controller turns off power to the coil 78 and the mass member 62 moves to actuate the acceleration pawl 68 to engage the acceleration sprocket 53 to stop rotation thereof, in turn, causing the locking pawl 50 via the spring to engage the locking sprocket 48, locking-up the restraint retractor 34. With the top wall 82 being radially located and the air gap between the core 80 and the mass member 62 being a minimum air gap, the coil 78 pulls the mass member 62 back to its central or neutral position when the G forces are less than three (3) G's. The mass member 62 maintains its position and the restraint retractor 34 is unlocked when the shoulder belt 28 goes back into the restraint retractor 34. It should be appreciated that the core 80 of the electromagnet assembly 76 has a very small diameter and the flux from the coil 78 saturates the core 80 and maintains a constant force on the mass member 62. It should also be appreciated that the cross-sectional area of the bottom wall 84 and top wall 82 is much greater than the core 80 such that the core 80 is saturated. It should further be appreciated that by having a saturated core 80, the electromagnet assembly 76 allows a limited "G" force (3 to 7 G's). It should be still further appreciated that for a force greater than the limited "G" force, the restraint retractor 34 will lock-up in a normal manner via the locking pawl 50 and locking sprocket 48.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An acceleration sensor assembly for a restraint retractor of a seat restraint system in a vehicle comprising:
    an acceleration sprocket operatively connected to the restraint retractor;
    an acceleration pawl cooperating with said acceleration sprocket to operatively cause lock up of the restraint retractor;
    a mass member cooperating with said acceleration pawl to move said acceleration pawl when an acceleration force is present;
    an electromagnet assembly cooperating with said mass member to hold said mass member in a predetermined position until the acceleration force exceeds a predetermined value and said mass member moves to actuate said acceleration pawl to engage said acceleration sprocket to operatively cause lock up the restraint retractor and prevent unwinding of a belt from the restraint retractor;
    wherein said electromagnet assembly includes a coil and a core disposed within said coil for cooperating with said mass member; and
    wherein said electromagnet assembly includes a top wall disposed adjacent said mass member, a side wall extending from said top wall and a bottom wall extending from said side wall and disposed adjacent said coil.

2. An acceleration sensor assembly as set forth in claim 1 wherein said top wall, said side wall and said bottom wall are made of a conductive material.

3. An acceleration sensor assembly as set forth in claim 1 wherein said core has a cross-sectional area less than a cross-sectional area of said top wall and said bottom wall.

4. An acceleration sensor assembly for a restraint retractor of a seat restraint system in a vehicle comprising:
    an acceleration sprocket operatively connected to the restraint retractor;
    an acceleration pawl cooperating with said acceleration sprocket to operatively cause lock up of the restraint retractor;
    a mass member cooperating with said acceleration pawl to move said acceleration pawl when an acceleration force is present;
    an electromagnet assembly cooperating with said mass member to hold said mass member in a predetermined position until the acceleration force exceeds a predetermined value and said mass member moves to actuate said acceleration pawl to engage said acceleration sprocket to operatively cause lock up the restraint retractor and prevent unwinding of a belt from the restraint retractor;
    a mass housing operatively connected to the restraint retractor, said mass member being disposed in said mass housing; and
    wherein said mass housing comprises a base wall and a side wall surrounding said base wall to form a cavity, said base wall including an aperture extending therethrough.

5. An acceleration sensor assembly as set forth in claim 4 wherein said mass member has a projection extending axially from one end and disposed in said aperture and a recess at an opposite end.

6. An acceleration sensor assembly as set forth in claim 5 wherein said acceleration pawl is pivotally connected to said mass housing and has a projection disposed in said recess of said mass member.

7. An acceleration sensor assembly as set forth in claim 6 wherein said acceleration sprocket has a plurality of teeth disposed circumferentially thereabout to cooperate with said acceleration pawl.

8. An acceleration sensor assembly as set forth in claim 7 wherein said mass member is made of a metal material.

9. A restraint retractor assembly for a seat restraint system in a vehicle comprising:
    a retractor housing;
    a rotatable shaft mounted to said retractor housing;
    a take-up spool mounted on said shaft and connected to a belt of a seat restraint system for winding and unwinding the belt;
    a locking sprocket operatively connected to said shaft;
    a locking pawl cooperating with said locking sprocket to lock up said restraint retractor;
    an acceleration sprocket operatively cooperating with said locking pawl;
    an acceleration pawl cooperating with said acceleration sprocket;
    a mass member cooperating with said acceleration pawl to move said acceleration pawl when an acceleration force is acting on said mass member;

an electromagnet assembly cooperating with said mass member to hold said mass member in a predetermined position until the acceleration force exceeds a predetermined value and said mass member moves to actuate said acceleration pawl to engage said acceleration sprocket for operatively cooperating with said locking pawl and said locking sprocket to lock up said shaft preventing unwinding of the belt from said take-up spool;

a mass housing operatively connected to said retractor housing; and wherein said mass housing comprises a base wall and a side wall surrounding said base wall to form a cavity, said base wall including an aperture extending therethrough.

10. A restraint retractor assembly as set forth in claim 9 wherein said mass member is disposed in said cavity and has a projection extending axially from one end and into said aperture and a recess at an opposite end.

11. A restraint retractor assembly as set forth in claim 10 wherein said acceleration pawl is pivotally connected to said mass housing and has a projection disposed in said recess of said mass member.

12. A restraint retractor assembly for a seat restraint system in a vehicle comprising:

a retractor housing;

a rotatable shaft mounted to said retractor housing;

a take-up spool mounted on said shaft and connected to a belt of a seat restraint system for winding and unwinding the belt;

a locking sprocket operatively connected to said shaft;

a locking pawl cooperating with said locking sprocket to lock up said restraint retractor;

an acceleration sprocket operatively cooperating with said locking pawl;

an acceleration pawl cooperating with said acceleration sprocket;

a mass member cooperating with said acceleration pawl to move said acceleration pawl when an acceleration force is acting on said mass member;

an electromagnet assembly cooperating with said mass member to hold said mass member in a predetermined position until the acceleration force exceeds a predetermined value and said mass member moves to actuate said acceleration pawl to engage said acceleration sprocket for operatively cooperating with said locking pawl and said locking sprocket to lock up said shaft preventing unwinding of the belt from said take-up spool;

wherein said electromagnet assembly includes a coil and a core disposed within said coil and cooperating with said mass member; and wherein said electromagnet assembly includes a top wall disposed adjacent said mass member, a side wall extending from said top wall and a bottom wall extending from said side wall and disposed adjacent said coil.

13. A restraint retractor assembly as set forth in claim 12 wherein said top wall, said side wall and said bottom wall are made of a ferrous material.

14. A seat restraint system for a vehicle comprising:

a restraint retractor for operative connection to a seat in the vehicle and connected to a belt of a seat restraint system for winding and unwinding the belt;

an acceleration sprocket operatively connected to said restraint retractor;

an acceleration pawl cooperating with said acceleration sprocket to operatively cause lock up of said restraint retractor;

a mass member cooperating with said pawl member to move said acceleration pawl when an acceleration force is present;

an electromagnet assembly cooperating with said mass member to hold said mass member in a predetermined position until the acceleration force exceeds a predetermined value and said mass member moves to actuate said acceleration pawl to engage said acceleration sprocket to operatively cause lock up the restraint retractor and prevent unwinding of a belt from said restraint retractor;

a mass housing operatively connected to said retractor housing, wherein said mass housing comprises a base wall and a side wall surrounding said base wall to form a cavity, said base wall including an aperture extending therethrough and said mass member being disposed in said cavity; and said electromagnet assembly includes a coil and a core disposed within said coil and extending toward said aperture in said mass housing to cooperate with said mass member.

* * * * *